(12) United States Patent
Otake

(10) Patent No.: US 7,664,863 B2
(45) Date of Patent: Feb. 16, 2010

(54) DATA TRANSFERRING METHOD

(75) Inventor: Toshiaki Otake, Kanagawa (JP)

(73) Assignee: Sony Manufacturing Systems Corporation, Tokyo (JP)

( * ) Notice: Subject to any disclaimer, the term of this patent is extended or adjusted under 35 U.S.C. 154(b) by 840 days.

(21) Appl. No.: 10/446,552

(22) Filed: May 27, 2003

(65) Prior Publication Data

US 2003/0236899 A1 Dec. 25, 2003

(30) Foreign Application Priority Data

Jun. 7, 2002 (JP) ............................. 2002-167812

(51) Int. Cl.
*G06F 15/16* (2006.01)
(52) U.S. Cl. ...................... 709/228; 709/220; 709/230; 709/237; 709/249
(58) Field of Classification Search ................. 709/227, 709/228, 220, 230, 237, 249
See application file for complete search history.

(56) References Cited

U.S. PATENT DOCUMENTS

| | | | | |
|---|---|---|---|---|
| 4,645,874 A | | 2/1987 | Fildes | 379/93 |
| 5,574,860 A | * | 11/1996 | Perlman et al. | 709/220 |
| 5,802,106 A | | 9/1998 | Packer | 375/225 |
| 5,948,136 A | * | 9/1999 | Smyers | 710/107 |
| 6,038,625 A | * | 3/2000 | Ogino et al. | 710/104 |
| 6,041,049 A | * | 3/2000 | Brady | 370/351 |
| 6,185,218 B1 | | 2/2001 | Ratcliff et al. | 370/405 |
| 6,185,632 B1 | * | 2/2001 | Berkema | 710/20 |
| 6,452,693 B1 | * | 9/2002 | Isoda et al. | 358/1.16 |
| 6,477,587 B1 | * | 11/2002 | Isoda et al. | 710/6 |
| 6,628,607 B1 | * | 9/2003 | Hauck et al. | 370/216 |
| 6,973,053 B1 | * | 12/2005 | Passman et al. | 370/310 |
| 7,017,180 B1 | * | 3/2006 | Nagasaka | 726/3 |
| 7,047,323 B2 | * | 5/2006 | Ebata | 710/10 |
| 7,203,732 B2 | * | 4/2007 | McCabe et al. | 709/217 |

FOREIGN PATENT DOCUMENTS

| | | |
|---|---|---|
| JP | 2000-151664 | 5/2000 |
| JP | 2000-253024 | 9/2000 |
| JP | 2000259208 A * | 9/2000 |

OTHER PUBLICATIONS

The Institute of Electrical and Electronic Engineers, Inc., P1394 Standard for a High Performance Serial Bus, Jul. 7, 1995, Piscataway, New Jersey.

* cited by examiner

*Primary Examiner*—William C Vaughn, Jr.
*Assistant Examiner*—Carlos R Perez Toro
(74) *Attorney, Agent, or Firm*—Haverstock & Owens LLP

(57) ABSTRACT

The data transfer between an initiator and a target, interconnected over an IEEE1394 interface, is to be improved in efficiency. At the time of login, the buffer information of the targets 11 to 14 is acquired by an initiator 10. Based on the buffer information, acquired by the initiator 10, a data transfer table, at least including the node ID information of the targets 11 to 14, address information of the buffer memory and the data transmission/receipt specifying information for specifying the transmission or receipt of the data, is formulated. The data transfer table, formulated by the initiator, is supplied to each target. When a signal instructing the transfer of the data is input, handshaking is performed between the initiator 10 and the targets 11 to 14, based on the predetermined information appended to the transfer protocol of the interface, to effect the data transfer based on the data transfer table.

12 Claims, 18 Drawing Sheets

MSB

| RESERVE | TRANSFER PERMIT OWN NODE OFFSET HIGH ADDRESS n |
|---|---|
| TRANSFER PERMIT OWN NODE OFFSET LOW ADDRESS n || 
| TRANSFER PERMIT OTHER NODE ID | TRANSFER PERMIT OTHER NODE OFFSET HIGH ADDRESS n |
| TRANSFER PERMIT OTHER NODE OFFSET LOW ADDRESS n ||
| TRANSFER PERMIT DATA SIZE n | W | S | RESERVE | DATA TRANSFER FREQUENCY DIVISION RATIO |
| RESERVE | TRANSFER PERMIT OWN NODE OFFSET HIGH ADDRESS n-1 |
| TRANSFER PERMIT OWN NODE OFFSET LOW ADDRESS n-1 ||
| TRANSFER PERMIT OTHER NODE IDn-1 | TRANSFER PERMIT OTHER NODE OFFSET HIGH ADDRESS n-1 |
| TRANSFER PERMIT OTHER NODE OFFSET LOW ADDRESS n-1 ||
| TRANSFER PERMIT DATA SIZE n-1 | W | S | RESERVE | DATA TRANSFER FREQUENCY DIVISION RATIO |

⋮

| RESERVE | TRANSFER PERMIT OWN NODE OFFSET HIGH ADDRESS 2 |
|---|---|
| TRANSFER PERMIT OWN NODE OFFSET LOW ADDRESS 2 ||
| TRANSFER PERMIT OTHER NODE ID2 | TRANSFER PERMIT OTHER NODE OFFSET HIGH ADDRESS 2 |
| TRANSFER PERMIT OTHER NODE OFFSET LOW ADDRESS 2 ||
| TRANSFER PERMIT DATA SIZE | W | S | RESERVE | DATA TRANSFER FREQUENCY DIVISION RATIO |
| RESERVE | TRANSFER PERMIT OWN NODE OFFSET HIGH ADDRESS 1 |
| TRANSFER PERMIT OWN NODE OFFSET LOW ADDRESS 1 ||
| TRANSFER PERMIT OTHER NODE ID1 | TRANSFER PERMIT OTHER NODE OFFSET HIGH ADDRESS 1 |
| TRANSFER PERMIT OTHER NODE OFFSET LOW ADDRESS 1 ||
| TRANSFER PERMIT DATA SIZE 1 | W | S | RESERVE | DATA TRANSFER FREQUENCY DIVISION RATIO |

W: OVERWRITE PERMIT BIT (1: PERMIT, 0: NOT PERMIT)    LSB
S: TRANSMIT BIT (1: TRANSMIT, 0: RECEIVE)

FIG.3

| INITIATOR 10 NodeID=FFC4h | TARGET 11 NodeID=FFC0h | TARGET 12 NodeID=FFC1h | TARGET 13 NodeID=FFC2h | TARGET 14 NodeID=FFC3h |
|---|---|---|---|---|
| MSB | MSB | MSB | MSB | MSB |
| 0000h \| 0000h | 0000h \| 000h | 0000h \| 0000h | 0000h \| 0000h | 0000h \| 0000h |
| 00000100h | C0000100h | C0000100h | C0000100h | C0000100h |
| 0000h \| 0000h | 0000h \| 0000h | 0000h \| 0000h | 0000h \| 0000h | 0000h \| 0000h |
| 00000000h | 00000000h | 00000000h | 00000000h | 00000000h |
| 8000h \| 0001h | 8000h \| 0001h | 8000h \| 0001h | 8000h \| 0001h | 8000h \| 0001h |
| 0000h \| 0000h | 0000h \| 000h | 0000h \| 0000h | 0000h \| 0000h | 0000h \| 0000h |
| 00000200h | C0000200h | C0000200h | C0000200h | C0000200h |
| 0000h \| 0000h | 0000h \| 0000h | 0000h \| 0000h | 0000h \| 0000h | 0000h \| 0000h |
| 00000000h | 00000000h | 00000000h | 00000000h | 00000000h |
| 8000h \| 0001h | 8000h \| 0001h | 8000h \| 0001h | 8000h \| 0001h | 8000h \| 0001h |
| 0000h \| 0000h | 0000h \| 000h | 0000h \| 0000h | 0000h \| 0000h | 0000h \| 0000h |
| 00000300h | C0000300h | C0000300h | C0000300h | C0000300h |
| 0000h \| 0000h | 0000h \| 0000h | 0000h \| 0000h | 0000h \| 0000h | 0000h \| 0000h |
| 00000000h | 00000000h | 00000000h | 00000000h | 00000000h |
| 8000h \| 0001h | 8000h \| 0001h | 8000h \| 0001h | 8000h \| 0001h | 8000h \| 0001h |
| 0000h \| 0000h | 0000h \| 0000h | 0000h \| 0000h | 0000h \| 0000h | 0000h \| 0000h |
| 00000400h | C0000400h | C0000400h | C0000400h | C0000400h |
| 0000h \| 0000h | 0000h \| 0000h | 0000h \| 0000h | 0000h \| 0000h | 0000h \| 0000h |
| 00000000h | 00000000h | 00000000h | 00000000h | 00000000h |
| 8000h \| 0001h | 8000h \| 0001h | 8000h \| 0001h | 8000h \| 0001h | 8000h \| 0001h |
| 00000004h | 00000004h | 00000004h | 00000004h | 00000004h |
| LSB | LSB | LSB | LSB | LSB |

FIG. 4

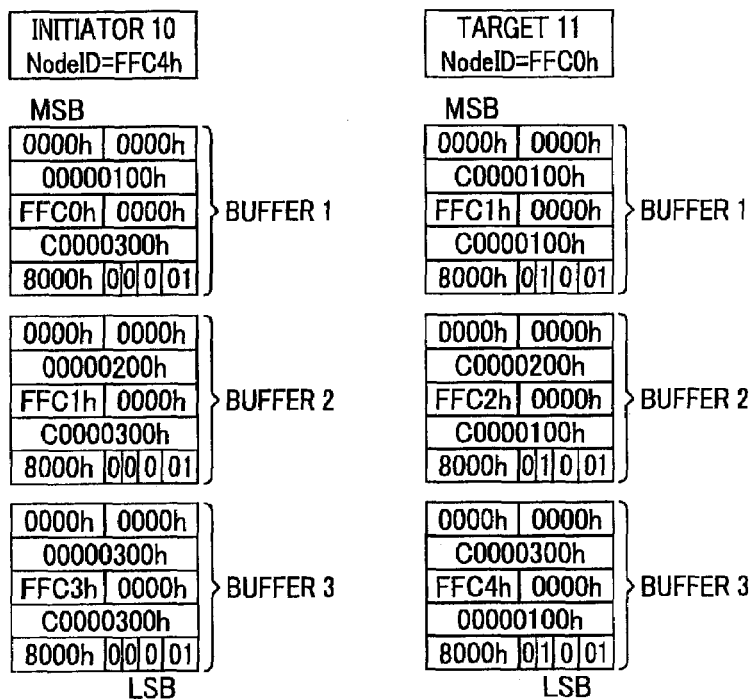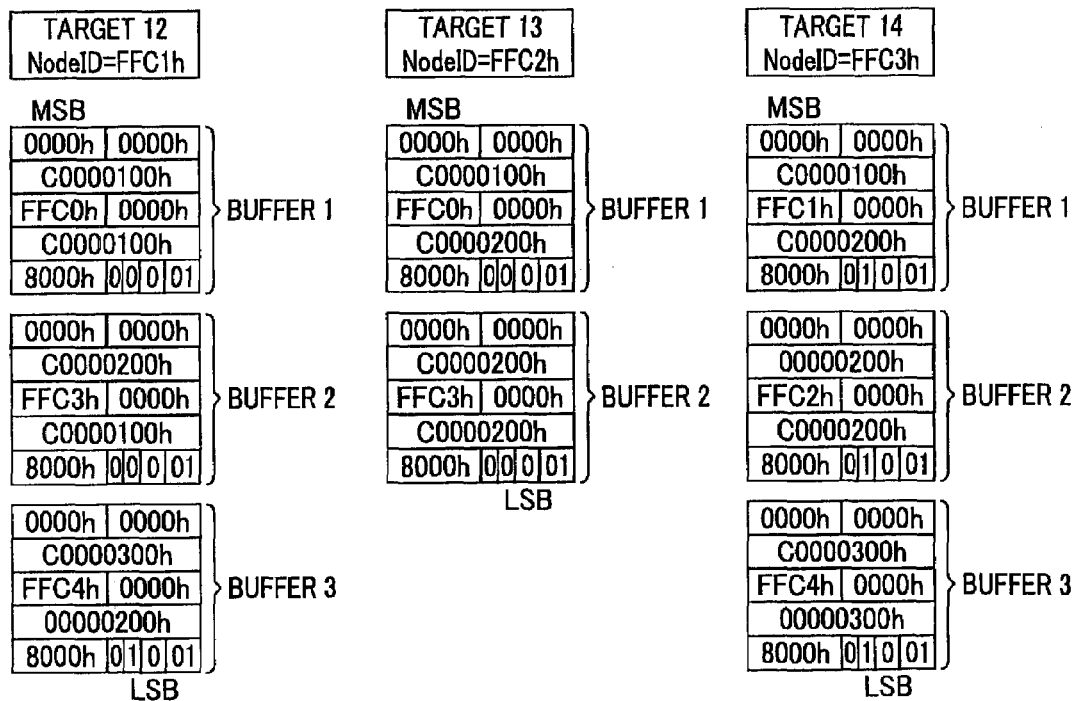
FIG.5

| INITIATOR 10 NodeID=FFC4h | TARGET 11 NodeID=FFC0h | TARGET 12 NodeID=FFC1h | TARGET 13 NodeID=FFC2h | TARGET 14 NodeID=FFC3h |
|---|---|---|---|---|
| MSB | MSB | MSB | MSB | MSB |
| 0000h \| 0000h | 0000h \| 0000h | 0000h \| 0000h | 0000h \| 0000h | 0000h \| 0000h |
| 00000100h | C0000100h | C0000100h | C0000100h | C0000100h |
| FFC0h \| 0000h | FFC1h \| 0000h | FFC0h \| 0000h | FFC0h \| 0000h | FFC1h \| 0000h |
| C0000300h | C0000100h | C0000100h | C0000200h | C0000200h |
| 8000h \|0\|0\|0\|01 | 8000h \|0\|1\|0\|01 | 8000h \|0\|0\|0\|01 | 8000h \|0\|0\|0\|01 | 8000h \|0\|1\|0\|01 |
| 0000h \| 0000h | 0000h \| 0000h | 0000h \| 0000h | 0000h \| 0000h | 0000h \| 0000h |
| 00000200h | C0000200h | C0000200h | C0000200h | C0000200h |
| FFC1h \| 0000h | FFC2h \| 0000h | FFC3h \| 0000h | FFC3h \| 0000h | FFC2h \| 0000h |
| C0000300h | C0000100h | C0000100h | C0000200h | C0000200h |
| 8000h \|0\|0\|0\|01 | 8000h \|0\|1\|0\|01 | 8000h \|0\|0\|0\|01 | 8000h \|0\|0\|0\|01 | 8000h \|0\|1\|0\|01 |
| 0000h \| 0000h | 0000h \| 0000h | 0000h \| 0000h | 0000h \| 0000h | 0000h \| 0000h |
| 00000300h | C0000300h | C0000300h | C0000300h | C0000300h |
| FFC3h \| 0000h | FFC4h \| 0000h | FFC4h \| 0000h | 0000h \| 0000h | FFC4h \| 0000h |
| C0000300h | 00000100h | 00000200h | 00000000h | 00000300h |
| 8000h \|0\|0\|0\|01 | 8000h \|0\|1\|0\|01 | 8000h \|0\|1\|0\|01 | 8000h \| 0001h | 8000h \|0\|1\|0\|01 |
| 0000h \| 0000h | 0000h \| 0000h | 0000h \| 0000h | 0000h \| 0000h | 0000h \| 0000h |
| 00000400h | C0000400h | C0000400h | C0000400h | C0000400h |
| 0000h \| 0001h | 0000h \| 0000h | 0000h \| 0000h | 0000h \| 0000h | 0000h \| 0000h |
| 00000000h | 00000000h | 00000000h | 00000000h | 00000000h |
| 8000h \| 0001h | 8000h \| 0001h | 8000h \| 0001h | 8000h \| 0001h | 8000h \| 0001h |
| 00000004h | 00000004h | 00000004h | 00000004h | 00000004h |
| LSB | LSB | LSB | LSB | LSB |

FIG.6

DATA TRANSFERRING METHOD

BACKGROUND OF THE INVENTION

1. Field of the Invention

This invention relates to a data transferring method for transferring data between an initiator and plural targets.

This application claims the priority of the Japanese Patent Application No. 2002-167812 filed on Jun. 7, 2002, the entirety of which is incorporated by reference herein.

2. Description of Related Art

Nowadays, there is a demand for a high-speed interface, convenient for transferring digital data, such as acoustic data or picture data. Several next-generation interface standards have already been proposed, such that, as an interface for high speed data transfer not only between computers and peripherals but also between digital equipment including household equipment exemplified by digital video cameras, digital equipment, employing the IEEE1394 interface, have now begun to be commercialized. This interface standard, proposed by the IEEE (The Institute of Electrical and Electronics Engineers, Inc.), and prescribed as the IEEE Std. 1394-1995 IEEE Standard for a High Performance Serial Bus, has a high transfer rate of hundreds of Mbits/sec, and yet supports synchronous transfer, live-line connection/disconnection or high freedom degree connection topology, so that it is a high convenience serial interface which also takes general household use into account.

The technique employing this IEEE1394 interface has already been stated in for example the gazette of Japanese Patent 3091184. As stated in this gazette, in transferring digital data, using a packet composed of a preset data block and the appended information, such as the destination of transmission, a receipt equipment on receipt of the packet transmitted from the transmitting equipment returns an acknowledgment ACK representing the received state of the packet to the transmitting equipment of the source of transmission from time to time to cause the packet to be re-transmitted from the sending equipment as necessary, with a view to improving data transmission reliability. For example, in a packet communication between the first and second equipment, interconnected over the IEEE1394 interface, if a request packet requesting a preset operation from a first equipment 1 is sent to and received by a second equipment 2, an acknowledgment ACK representing the received state of the request packet is returned from the second equipment 2 to the first equipment 1, as shown in FIG. 11. This acknowledgment ACK includes the information for advising the source of transmission of the necessity for re-transmission, completion of receipt etc and, if the acknowledgment ACK requesting the re-transmission is received from the first equipment 1, the same request packet is re-transmitted from the first equipment 1 to the second equipment 2. If the completion of the receipt is informed by the above acknowledgment ACK to the first equipment 1, the preset operation is being performed by the second equipment 2. Thus, the first equipment 1 is in a standby state until such time a response packet associated with the request packet is transmitted from the second equipment 2. When the preset operation in the second equipment 2 has come to a close, the response packet, including the results of the above-mentioned preset operation, is sent from the second equipment 2 to the first equipment 1. On receipt of the response packet, the first equipment 1 returns an acknowledgment ACK, indicating the request for re-transmission or completion of processing, to the second equipment 2. If, in this case, the acknowledgment ACK is requesting re-transmission, the same response packet is retransmitted from the second equipment 2 to the first equipment 1. If the acknowledgment ACK indicates the end of the processing, the second equipment 2 is set to a state opened for the next processing.

Meanwhile, one of the application protocols in the above IEEE1394 interface is SBP-2 (Serial Bus Protocol 2). For illustrating this SBP2, FIG. 12 shows the relationship between the layered structure of the IEEE1394 interface and the SBP2. Referring to FIG. 12, the layered structure of the above IEEE1394 interface is basically made up by three layers, namely a physical layer, a link layer and a transaction layer. The SBP2 belongs to a transport layer which is higher than the transaction layer, and includes, for example, the functions of efficiently transmitting commands or data between the various devices, such as discs, tapes, printers, scanners or digital cameras, referred to below as nodes, or of notifying an application of an upper order than the SBP2 of the state of the operations of commands, results thereof or whether or not data transfer may be terminated. In the SBP2, the nodes responsible for sending out real commands, including management request commands, such as login of connection request, logout of connection completion or data write/readout, such as scanners or digital cameras, are termed initiators, while the nodes responsible for receiving the commands from the initiator to effect actual processing, such as discs, CD-ROMs or printers, are termed targets. It is between the initiators and the targets that communication takes place. As for the target, a logical unit equivalent to an actual device, namely the disc, CD-ROM and the printer, is strictly handled as a unit of such target, and communication takes place between at least one logical unit provided in the target and the initiator as a pair.

The procedure of the communication between the initiator and the target is shown in FIG. 13. FIG. 14 shows the data structure of a login request block in the SBP2, FIG. 15 shows the data format of a communication packet in the IEEE1394 interface, FIG. 16 shows the data structure of a login response block and FIG. 17 shows the data structure of a logout request block. Prior to transmission of all commands to a target 22, as a counterpart party of communication, an initiator 21 has to send out a login request to a logical unit of the target 22, as shown in FIG. 13. The data structure of a login request block is shown in FIG. 14. The data structure of the block in the SBP2 is termed an ORB (operation request block). In a "function" field of the log-in request block, among management blocks, there is stated "0" representing the login, as shown in FIG. 14. The logical unit of the target 22, a an object of login of the initiator 21, is specified by a "lun" field representing the logical unit number. This ORB is inserted into a data section of a transaction packet in the IEEE1394 interface shown in FIG. 15 and is sent by the transaction packet so as to be sent from the initiator 21 specified by an ID field as a source of transmission of the packet header to a target 22 specified by the ID field of a source of transmission of the packet header. On receipt of the login request packet from the initiator 21, the packet is accepted by a mechanism, termed a management agent, responsible for processing the management block, in the logical unit specified by the "lun" field of the target 22. The information pertinent to the base address of the register of this management agent (control and status register or CSR) is pre-stored in a ROM termed a configuration ROM. By referring to this configuration ROM, the management agent is able to accept the login request packet. The management agent verifies whether or not the login may be allowed in connection with the login request, that is whether or not communication is possible. If the login is allowable, a login response in meeting with the login request packet is returned from the target 22 to the initiator 21. The data structure of the login response request block is shown in FIG. 16. This login response request block includes a login ID field for identifying the login, and a command block agent field for stating the base address of the CSR of the mechanism, termed a fetch agent, in which the initiator 21 accepts a command request issued by the initiator 21 for the target 22 to perform the processing within the target 22. In this fetch agent, in distinction from the management agent, the relative address relationship in the register is predetermined, however, the base address itself is allocated to a position in a register space provided in an address space in the IEEE1394 interface for each login, so that, in order for the initiator to execute the command by the fetch agent, the above-mentioned base address is needed. If the login has met with success in this manner, the initiator 21 refers to the base address of the CSR of the fetch agent specified in the login response packet and, using this base address, a request for executing the command (write, readout and lock) is sent from the initiator 21 to the target 22. The target 22 holds a login identifier, including the logical unit number lun, login owner ID, . . . , login ID (loginID), for each login. When the target 22 receives a command execute request, the loginID associated with the source of transmission ID is referenced from the login identifier. Using the associated base address, the fetch agent is selected to execute the command. On completion of the processing of the command, the result is transmitted to the initiator 21, using the status block. When the needed command is executed in accordance with the above-described sequence of operations, the initiator 21 sends out a logout request to the target 22. The data structure of the logout request block is shown in FIG. 17. In this figure, the loginID field is included in the logout request block in which the loginID used in this communication is entered. In the function field, "7" indicating logout is entered. When the logout request packet is received by the target 22, the packet is accepted by the management agent in the target 22. Based on this loginID, the base address of the fetch agent, so far used, is set in a re-usable state. When the logout processing has come to a close, an end notice is sent to the initiator 21, using the status block. This terminates the communication such that the logical unit of the target 22 specified is opened.

In a data transfer system 2, shown in FIG. 18, data transfer is carried out using the above-described technique. The data transfer system 2 includes an initiator 21 and targets 22 to 24, as shown in FIG. 18. The respective equipment are interconnected by the aforementioned IEEE1394 interface.

FIG. 18 indicates that the target 21 transfers data to the initiator 20 and to the targets 22 and 23, the target 22 transfers data to the initiator 20, and that the target 24 transfers data to the targets 22 and 23.

Referring to FIG. 18, all data must traverse the initiator 20, so that, if the data is to be transferred from the target 21 to the target 22, the data needs to be transferred first from the target 21 to the initiator 20 and thence to the target 22, so that the transfer rate can scarcely be raised.

On the other hand, there are bidirectional transactions in the SBP2 by the aforementioned ORB, in addition to the data transfer. Due to these transactions, blank time is produced in data transfer to lower the data transfer speed, and hence the transfer rate can scarcely be raised.

Moreover, the handshaking between the equipment, needed in effecting the data transfer, has to be performed at least once every 65535 bytes which is provided for in the SBP2, with the result that the data transfer becomes time-consuming.

When data is read out from an external device, connected to a target, and the so read out data is transferred to plural targets, the data must be read out from the external device, for each target, and transferred to the targets, and hence plural transactions are produced on the inner bus of each target and on the IEEE1394 transactions, with the result that the data transfer rate tends to be lowered.

In addition, if, during data transfer by isochronous communication, the conventional data transfer method is used, and a data error has occurred, data re-transmission cannot be performed except on the page basis, with the result that the real-time characteristics tend to be lost. Furthermore, if the error processing described above is taken into account, data cannot be transferred except to a sole target.

SUMMARY OF THE INVENTION

It is therefore an object of the present invention to provide a data transfer method in which the data transfer rate and data transfer efficiency may be improved, and in which data may be re-transmitted as real-time characteristics in the data transfer are maintained.

The present invention provides a data transfer method in which, when an initiator executing predetermined processing and plural targets are interconnected over an interface, data is transferred between the initiator and one or more of the plural targets or between the targets, based on the transfer protocol of the interface. In the method of the present invention, the data transmission/receipt verifying information for verifying whether or not transmission/receipt at least of data used for the handshaking during data transfer is being performed is appended to the transfer protocol at the time of login of the initiator and the target. The initiator at the time of login acquires the buffer information of the target and, based on the so acquired buffer information, formulates a data transfer table at least including the ID information of the target, the address information of the buffer memory and the data transmission/receipt specifying information for specifying the data transmission or receipt, and sends the so generated data transfer table to the respective targets. The targets store the so supplied data transfer table and, responsive to a signal commanding the data transfer, commences the data transfer between the initiator and the target or between the targets, based on a data transfer command signal.

With the data transfer method according to the present invention, when an initiator executing predetermined processing and plural targets are interconnected over an interface, data is transferred between the initiator and one or more of the plural targets or between the targets, based on the transfer protocol of the interface. With the method of the present invention, the data transmission/receipt verifying information for verifying whether or not transmission/receipt at least of data used for the handshaking during data transfer is being performed is appended to the transfer protocol at the time of login of the initiator and the target. The initiator at the time of login acquires the buffer information of the target and, based on the so acquired buffer information, formulates a data transfer table at least including the ID information of the target, the address information of the buffer memory and the data transmission/receipt specifying information for specifying the data transmission or receipt, to send out the so generated data transfer table to the respective targets. The targets store the so supplied data transfer table and, responsive to a signal commanding the data transfer, commence the data transfer between the initiator and the target or between the targets, based on a data transfer command signal. Thus, the data transfer rate as well as the data transfer efficiency can be improved, while the data re-transmission may be performed as real-time characteristics in the data transfer are maintained.

BRIEF DESCRIPTION OF THE DRAWINGS

FIG. 3 shows the data structure of the buffer information according to the present invention.

FIG. 4 shows the specified data structure of the buffer information owned by the initiator and each target.

FIG. 5 shows the data structure of a table for data transfer generated by an initiator.

FIG. 6 shows the data structure in case the data transfer table generated by the initiator has been stored in a buffer by each target.

DESCRIPTION OF THE PREFERRED EMBODIMENTS

Figure 1:
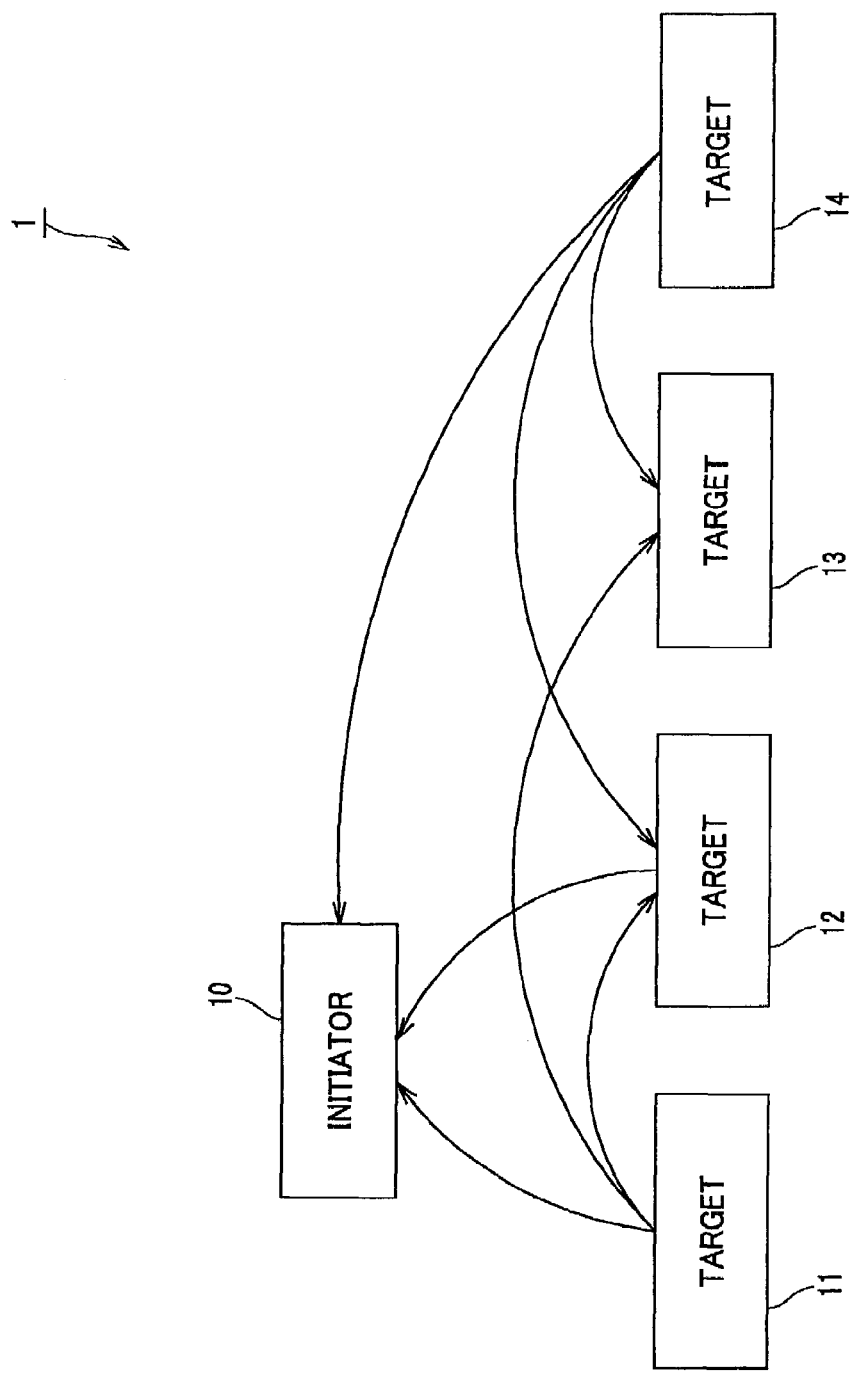
FIG. 1 is a block diagram showing the structure of a data transfer system employing the data transfer method of the present invention.

Referring to the drawings, preferred embodiments of the present invention will be explained in detail.

In the data transfer method according to the present invention, an initiator at least having a display unit, such as a PC (personal computer), and a target, connected to an external device, such as an HDD, a tape drive or a processing module, are interconnected over an IEEE1394 interface, and data transfer is carried out between the initiator and the target or between the targets, based on the SBP2 (Serial Bus Protocol 2) which is the transfer protocol of the IEEE1394 interface. The buffer information of the above target is acquired in login, and a table for data transfer is generated, based on the so acquired buffer information. The so generated data transfer table is supplied to each target, the so supplied data transfer table is stored in the buffer and, on receipt of a command from the initiator or a trigger signal from outside, handshaking takes place between the initiator and the target or between the targets, based on the predetermined information appended to the SBP2 to transfer the data based on the data transfer table.

An instance of a system employing the above-described data transfer method is hereinafter explained.

Figure 2A:
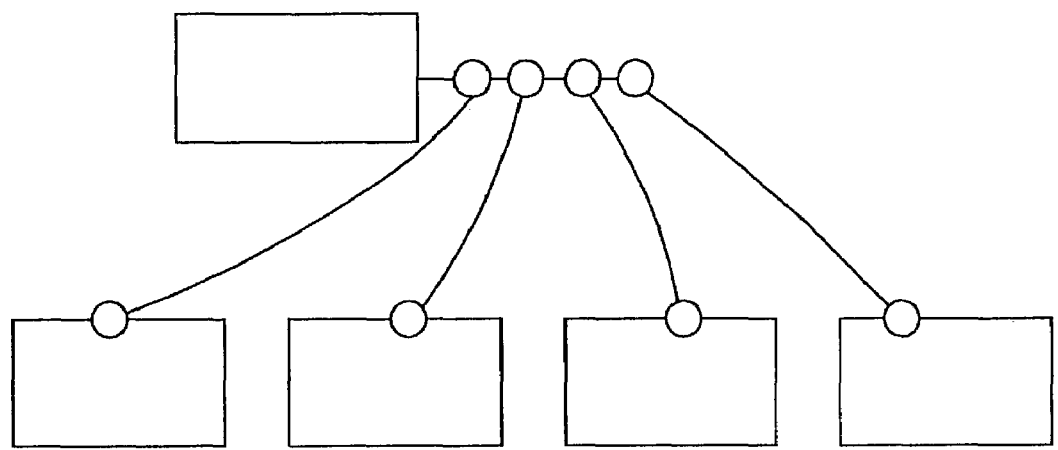
FIGS. 2A and 2B show an instance of connection topology of the interconnection by the IEEE 1394 interface.
Figure 2B:
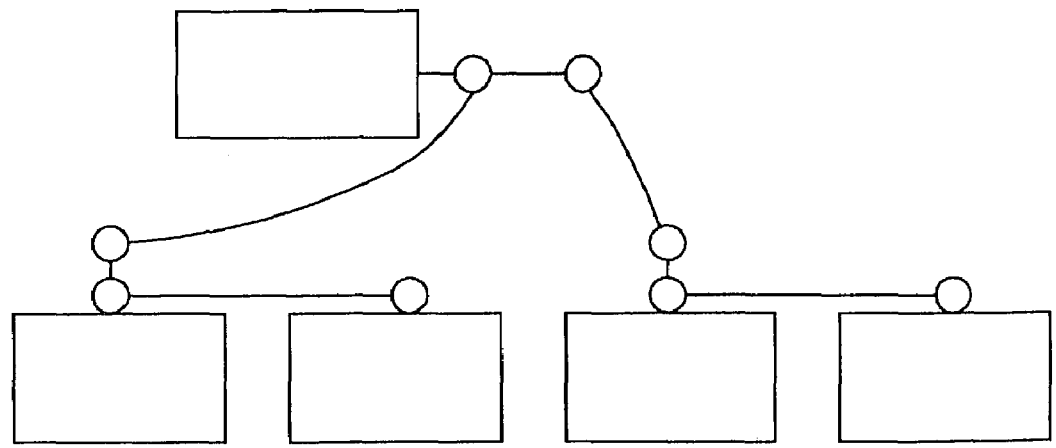

A data transfer system 1, employing the above-described data transfer method, includes an initiator 10 and targets 11 to 14, interconnected over an IEEE1394 interface, as shown in FIG. 1. Meanwhile, it is only sufficient that the connection topology is such topology prescribed by the standard of the IEEE1394 interface, as shown in FIGS. 2A and 2B.

The initiator 10, for example, is a display device not carrying the HDD, while the targets 11 to 14, for example, are a storage device connected to a CCD camera, operating as an external device, a noise removing device, a tape drive for data storage and a processing device for performing picture processing, respectively.

The data transfer operation, performed by the data transfer system 1, is hereinafter explained.

After booting the initiator 10 and the targets 11 to 14, the initiator 10 performs login to the respective targets. The initiator acquires the buffer information, shown in FIG. 3, from the respective targets.

The buffer information is now explained. In the buffer information, shown in FIG. 3, [reserve], [transfer permit own node offset HIGH address], [transfer permit own node offset LOW address], [transfer permit other node ID], [transfer permit other node offset HIGH address], [transfer permit other node offset LOW address], [transfer permit data size], [overwrite permit bit], [transmission/receipt bit], [reserve] and [data transfer frequency division ratio] are formed as one buffer from the MSB to the LSB. In the [transfer permit own node offset HIGH address] and in the [transfer permit own node offset LOW address], there is written the address of the initiator 10 if the own node is the initiator 10. In the [transfer permit other node ID], there is written the node ID of the counterpart party to whom data is to be transmitted. In the [transfer permit other node offset HIGH address] and in the [transfer permit other node offset address], there is written the address of the equipment of the counterpart party which has written into the [transfer permit other node ID]. In the [transfer permit data size], there is written the maximum range of the SBP2 specifications, for example, 65535 bytes. In the [overwrite permit bit], there is written overwrite permit (1) or not permit (0), while in the [transmission/receipt bit], there is written the data transmitting side (1) or the data receiving side (0). Meanwhile, the [transfer permit data size] is to be less than the capacity of the bank memory enclosed in a target as later explained.

In the following explanation, it is assumed that the buffer information shown in FIG. 4 has been acquired from the respective targets. It is also assumed that the node ID of the initiator 10 is [FCC4h], there being four buffers.

From the buffer information, acquired from the target 11, the initiator 10 learns that the node ID of the target 11 is [FFC0h] and that the number of the buffers is [00000004h], that is 4. From the buffer information, acquired from the target 12, the initiator 10 learns that the node ID of the target 12 is [FFC1h] and that the number of the buffers is [00000004h], that is 4. From the buffer information, acquired from the target 13, the initiator 10 learns that the node ID of the target 13 is [FFC2h] and that the number of the buffers is [00000004h], that is 4. Moreover, from the buffer information, acquired from the target 14, the initiator 10 learns that the node ID of the target 14 is [FFC3h] and that the number of the buffers is [0000004h], that is 4. Meanwhile, the number of buffers is acquired from the number of buffers display area appended to the trailing end of the buffer information of each target. The number of buffers being 4 means that data transfer can be made with four equipment, such that data transfer may be made with a number of the equipment equal to the number of the buffers.

The initiator 10 acquires the buffer information of FIG. 4 from each target and formulates a table of the flow of data transfer in advance. The formulation of the data transfer table in case the initiator 10 executes data transfer in a configuration shown for example in FIG. 1 is now explained. Meanwhile, the target 11 transfers the data, input from the device, connected thereto, to the initiator 10, target 12 and to the target 13. The target 12 has data transferred thereto from the targets 11 and 14 and transfers data to the initiator 10. The target 13 has data transferred from the targets 11 and 14. The target 14 transfers data to the initiator 10 and to the targets 12 and 13. The initiator 10 has data transferred thereto from the targets 11, 12 and 14.

The initiator formulates a data transfer table in such a manner as to effect information matching among the respective nodes. For example, when the data is transferred from the target 11 to the initiator 10, the initiator 10 formulates a data transfer table in such a manner that the buffer 1 of the initiator 10 will be matched to the buffer 3 of the target 11 and in such a manner that the buffer 3 of the target 11 will be matched to the buffer 1 of the initiator 10. Referring to FIG. 5, the initiator 10 writes [00000100h] in the [transfer permit own node offset LOW address] of the buffer 1 of the initiator 10, writes [FFC0h], as a node ID of the target 11, in the [transfer permit other node ID], writes [C0000300h], as an address of the buffer 3 of the target 11, in the [transfer permit other node offset LOW address], writes [8000h] in the [transfer permit data size], writes [0] indicating overwrite non-allowance, in the [overwrite permit bit] and writes [0] indicating a data receiving side in the [transmission/receipt bit]. The initiator 10 also writes [C0000300h] as an address of the buffer 3 of the target 11 in the [transfer permit own node offset LOW address], writes [FFC4h], as a node ID of the initiator 10, writes [000001001h], as an address of the buffer 1 of the initiator 10, in the address [transfer permit other node offset LOW address], writes [8000h] in the [transfer permit data size], writes [0] indicating overwrite non-allowance in the [overwrite permit bit] and writes [1] as a data receiving side in the [transmission/receipt bit]. The initiator 10 acts similarly for transfer of other data to formulate data transfer tables.

The initiator 10 sends the data transfer tables, formulated as shown in FIG. 5, to the respective targets. These targets hold the data transfer table, supplied from the initiator 10, in the buffers, as shown in FIG. 6. Meanwhile, the initiator 10 holds the totality of the data transfer tables, the target 11 holds the data transfer table for the target 11, the target 12 holds the data transfer table for the target 12, the target 13 holds the data transfer table for the target 13 and the target 14 holds the data transfer table for the target 14.

In this manner, in the data transfer system 1, the data transfer tables are formulated in the initiator 10, and the so formulated data transfer tables are supplied to the respective targets.

Figure 7:
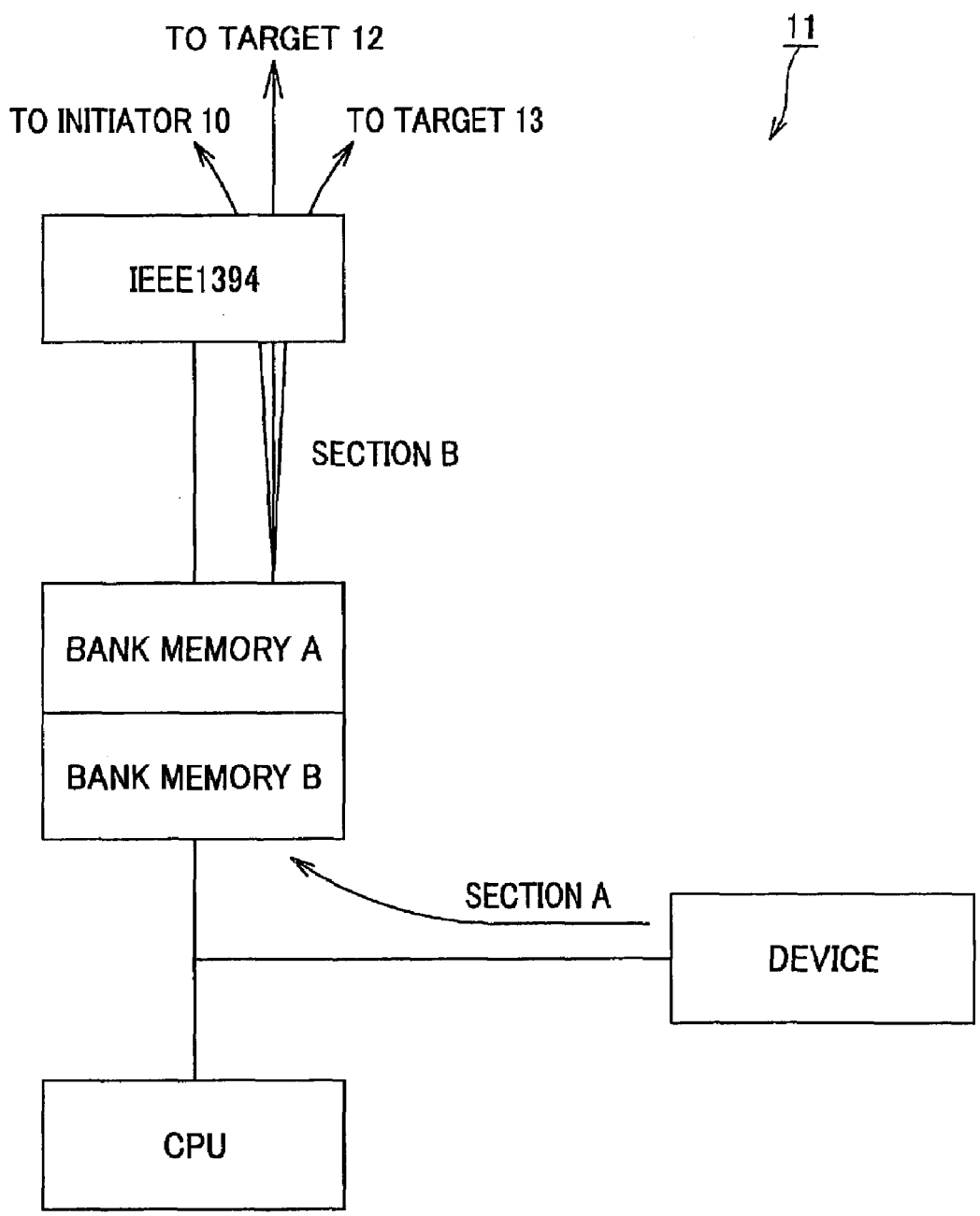
FIG. 7 is a block diagram showing the structure of a target owned by a data transfer system employing the data transfer method of the present invention.

Referring to FIG. 7, the structure of each target is explained. As shown in FIG. 7, the target provided to the data transfer system 1 includes a CPU, a bank memory A and a bank memory B. Moreover, the target has an external device connected thereto over a section A, while being connected over a section B to the initiator t0 and to the respective targets.

In the data transfer system 1, employing the data transfer method of the present invention, the above-described data transfer tables are formulated before proceeding to data transfer, and the so generated data transfer tables are afforded to the respective equipment, so that, in transferring data from one target to another target, such data transfer can be effected without interposition of the initiator 10.

If, in the target of the data transfer system 1, employing the data transfer method of the present invention, the same data is to be transmitted to plural equipment, the data is read out via the section A, and the so read out data is transiently stored in the bank memory A or in the bank memory B so as to be then transmitted from the bank memory A or the bank memory B to the respective equipment connected over the section B, thereby improving the data transfer rate.

Moreover, in the target, the data is transiently stored in the bank memory A and, during the time the data is transferred from the bank A to the respective equipment via section B, the next data is read out from the devices over section A. The so read out data is transiently stored in the bank memory B. After the end of the data transfer by the bank memory A, the memory responsible for transferring the data is changed to the bank memory B, and the data is transferred to the respective equipment from the bank memory B over section B. By efficiently changing over the bank memories in this manner, the data transfer rate can be improved further. Meanwhile, the bank memories A and B send out the data to the respective equipment in the form of packets, each made up by 65535 bytes.

Figure 8:
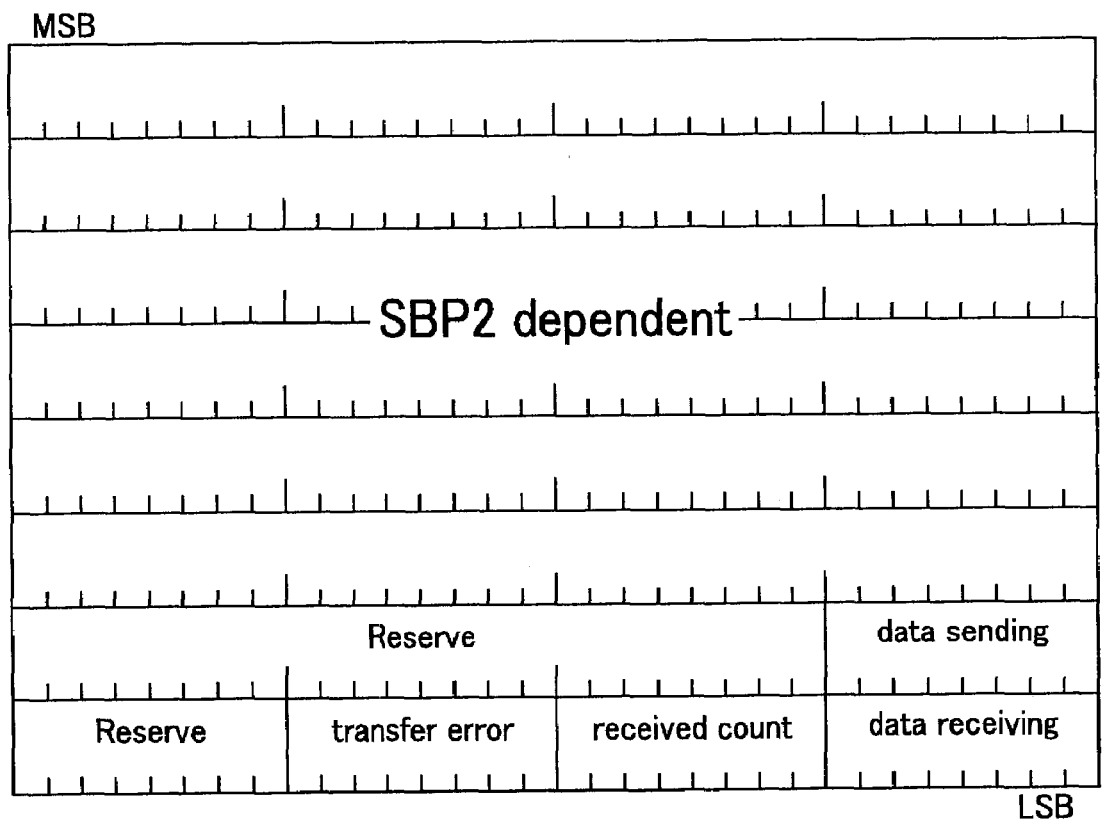
FIG. 8 shows a data structure of the SBP2 having appended the preset information.

In transferring the data to the respective equipment from the target, as the Source of data transmission, handshaking is required in effecting the data transfer. In the data transfer system 1, exploiting the data transfer method of the present invention, the information is appended to the SBP2 dependent, as shown in FIG. 8, and this appended information is acquired by way of performing the handshaking. The information appended to the SBP2 includes [data sending] indicating whether or not the data transmission is possible; [data receiving] indicating the data receiving state, [transfer error] indicating an error in the data transfer, and [received count] indicating the end of the data transfer, as shown in FIG. 8. The data capacity set for the information appended to the SBP2 is 8 bytes.

Meanwhile, in the conventional data transfer system, the following procedure was used in transferring data from the target 11 to the initiator 10.

(a-1) The initiator 10 issues a command requesting the target 11 to transfer the data over section B.

(a-2) The target 11 is responsive to the command to read out data from the devices over section A to hold the data in a memory.

(a-3) The target 11 packetizes the data stored in the memory to transfer the packetized data over section B to the initiator 10.

(a-4) After the end of the transfer of the packetized data, the initiator 10 sends out a command requesting the target 11 to transfer the next data over section B. The procedure of (a-2) to (a-3) above is repeated.

With this transfer method, handshaking becomes necessary each time one packet of data is transferred, so that the data transfer becomes time-consuming.

Moreover, in the conventional data transfer system, the following procedure was used in transferring data from the target 11 to the initiator 10 and to the target 12.

(b-1) The initiator 10 sends out a command requesting data transfer over section B to the target 11.

(b-2) The target 11 is responsive to the above command to read .out data from the devices over section A to store it in a memory.

(b-3) The target 11 packetizes the data stored in the memory to transfer the packetized data over section B to the initiator 10.

(b-4) After the end of transfer of the packetized data, the initiator 10 sends out a command requesting the target 11 to transfer the same data as the data of (b-3) over section B.

(b-5) The target 11 is responsive to the above command to read out the same data as the previous data over section A to store the data in a memory.

(b-6) The target 11 packetizes the data stored in the memory to transfer the packetized data over section B to the initiator 10.

(b-7) The initiator 10 sends out to the target 12 a command to the effect that data transfer is now to be made.

(b-8) The initiator 10 receives a command, to the effect that data transfer is permitted, from the target 12, to transfer the data received in (b-6) to the target 12.

Thus, in the conventional data transfer system, the initiator 10 must needs be interposed even when data is to be transferred from one target to the other target, so that difficulties are met in improving the transfer rate.

Moreover, in the conventional data transfer system, such a transaction is needed in which the target 11 again reads out the same data as that transferred to the initiator 10 from the device over section A to store the so read out data in the memory, as indicated in (b-4) and (b-5). Thus, in the conventional data transfer system, a number of the above transactions equal to the number of the equipment connected over section B for data transfer to render it difficult to improve the data transfer rate.

Figure 9:
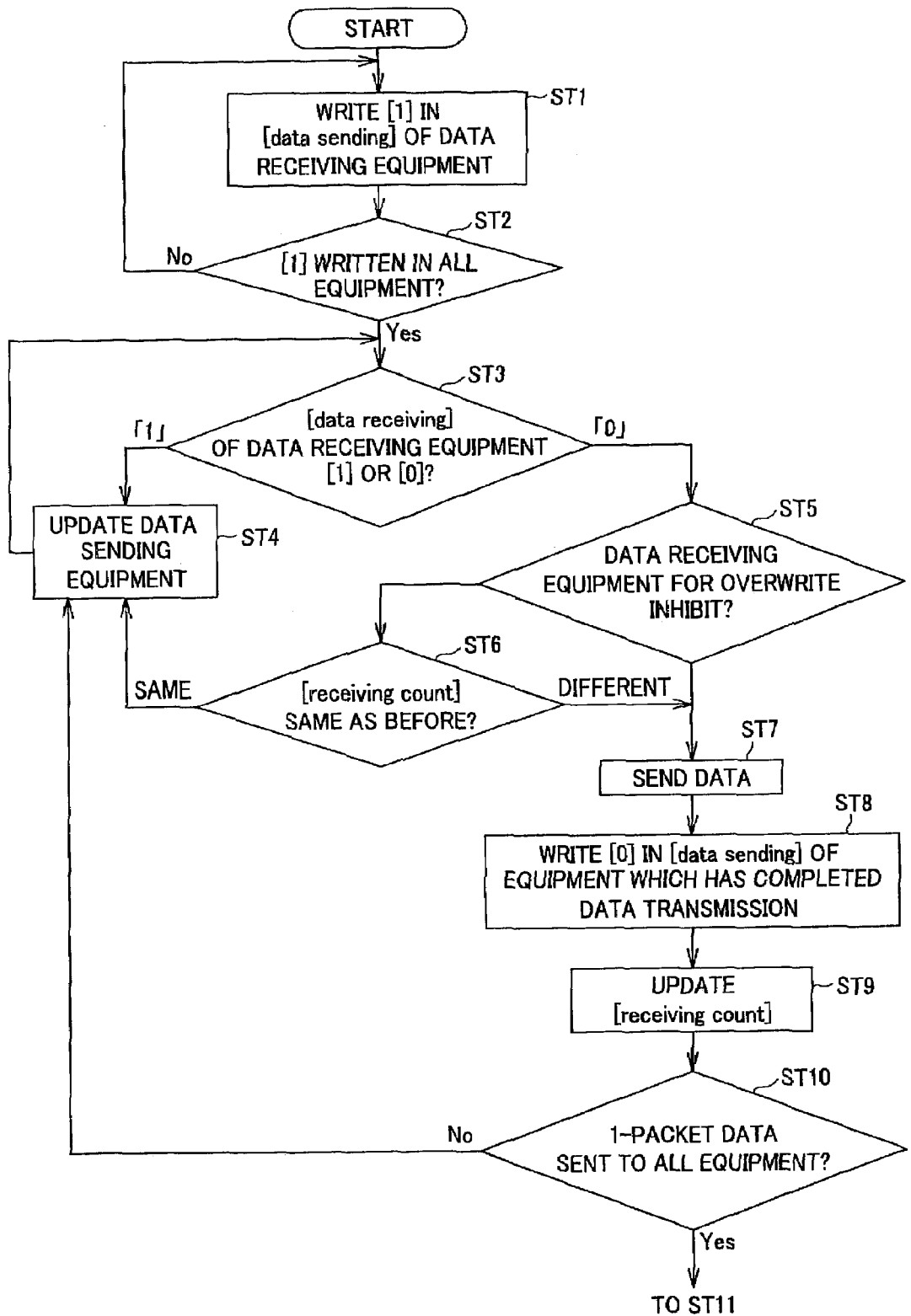
FIG. 9 depicts a first flowchart showing the data transfer by a data transfer system employing the data transfer method of the present invention.
Figure 10:
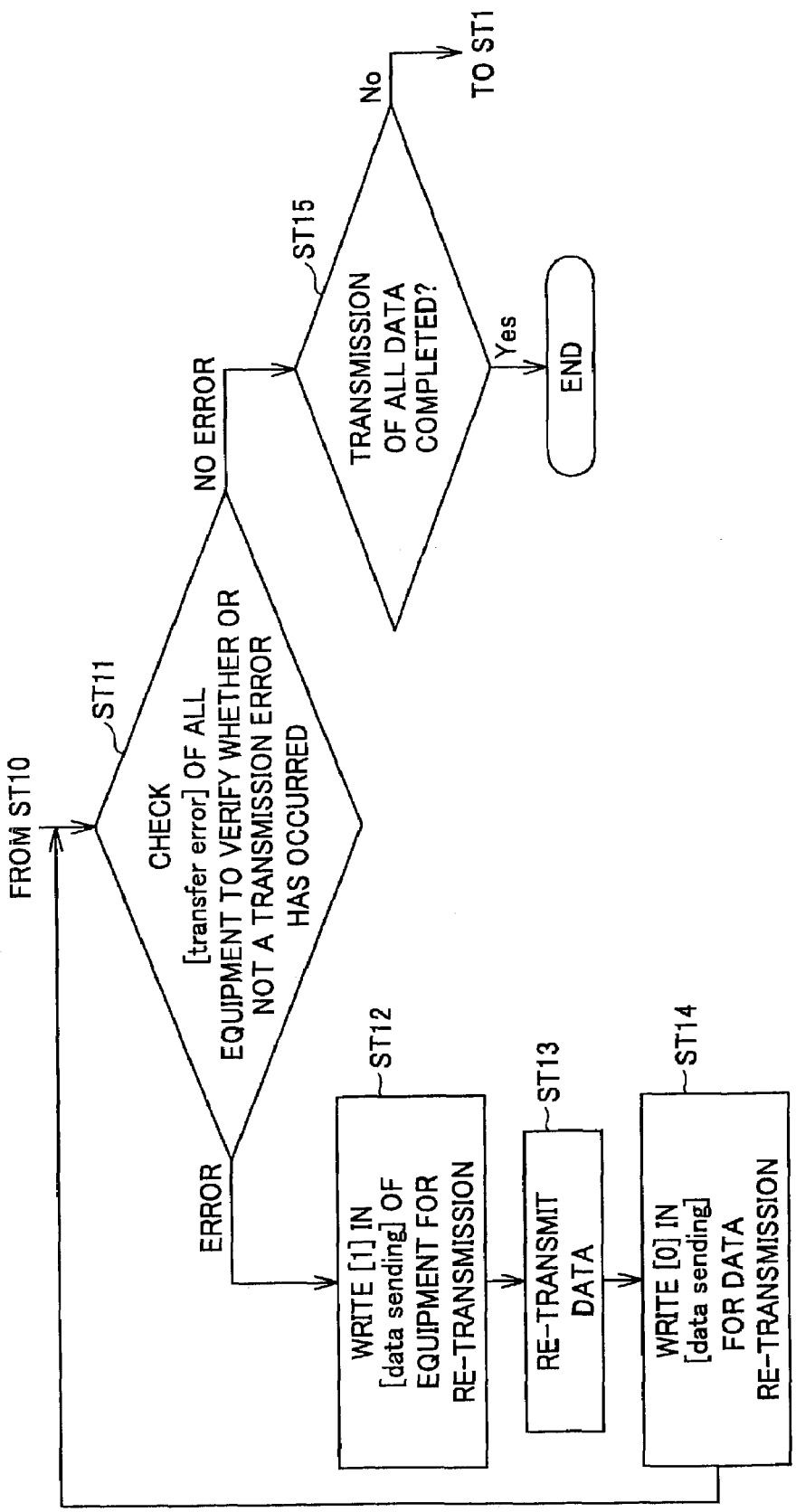
FIG. 10 depicts a second flowchart showing the data transfer by a data transfer system employing the data transfer method of the present invention.
Figure 11:
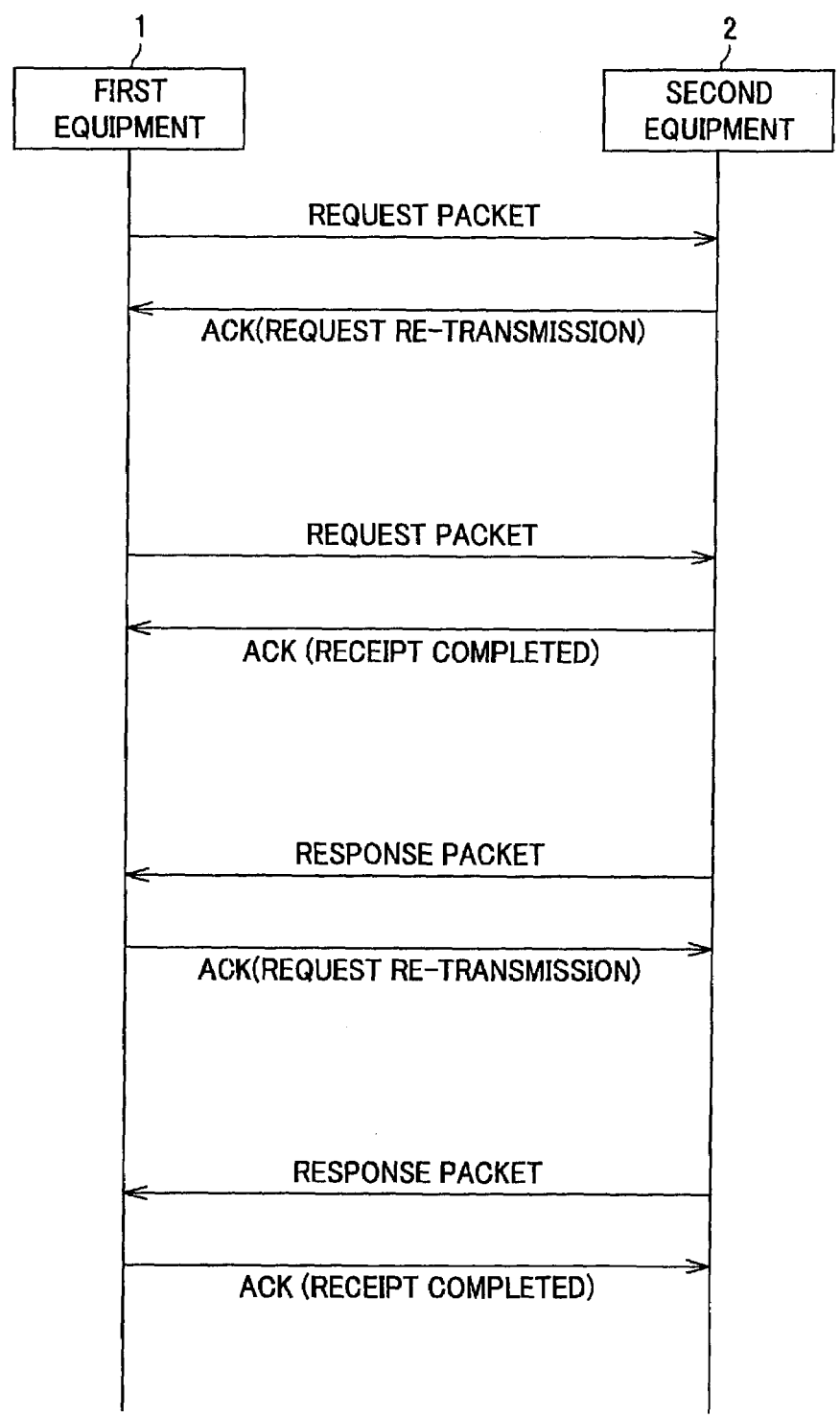
FIG. 11 illustrates an instance of the communication sequence between plural equipment performing packet communication.
Figure 12:
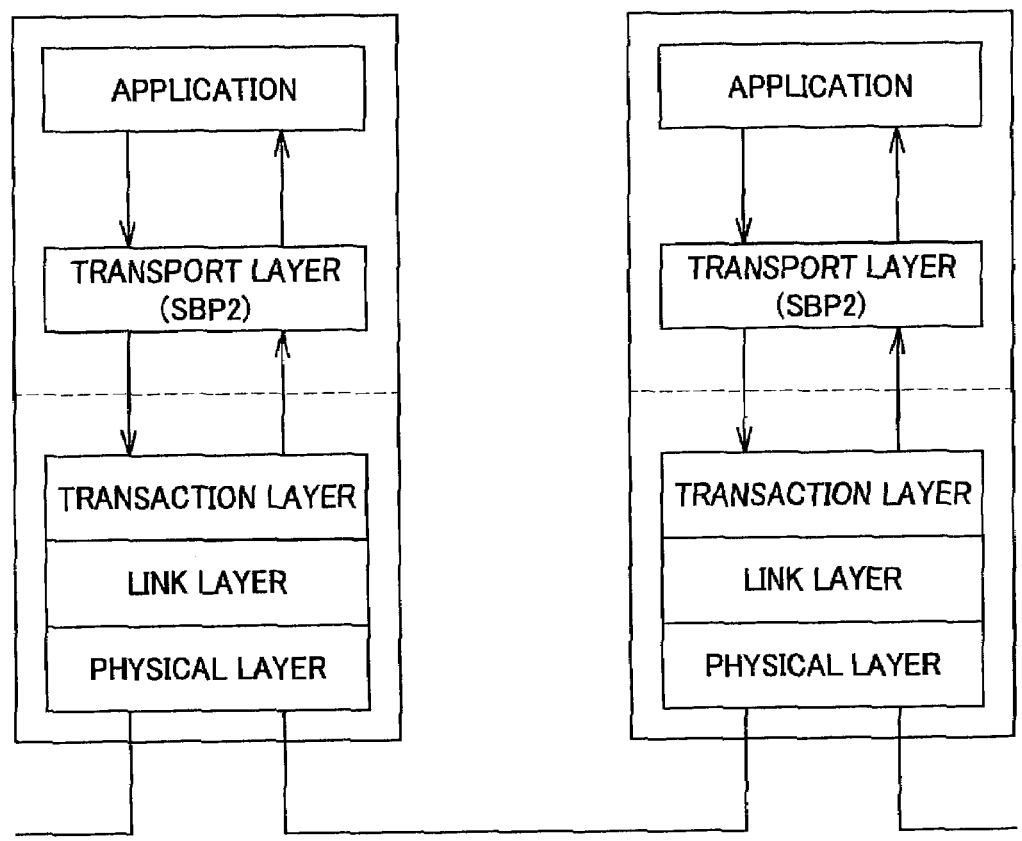
FIG. 12 depicts the relationship between the layered structure of the IEEE1394 interface and SBP2.
Figure 13:
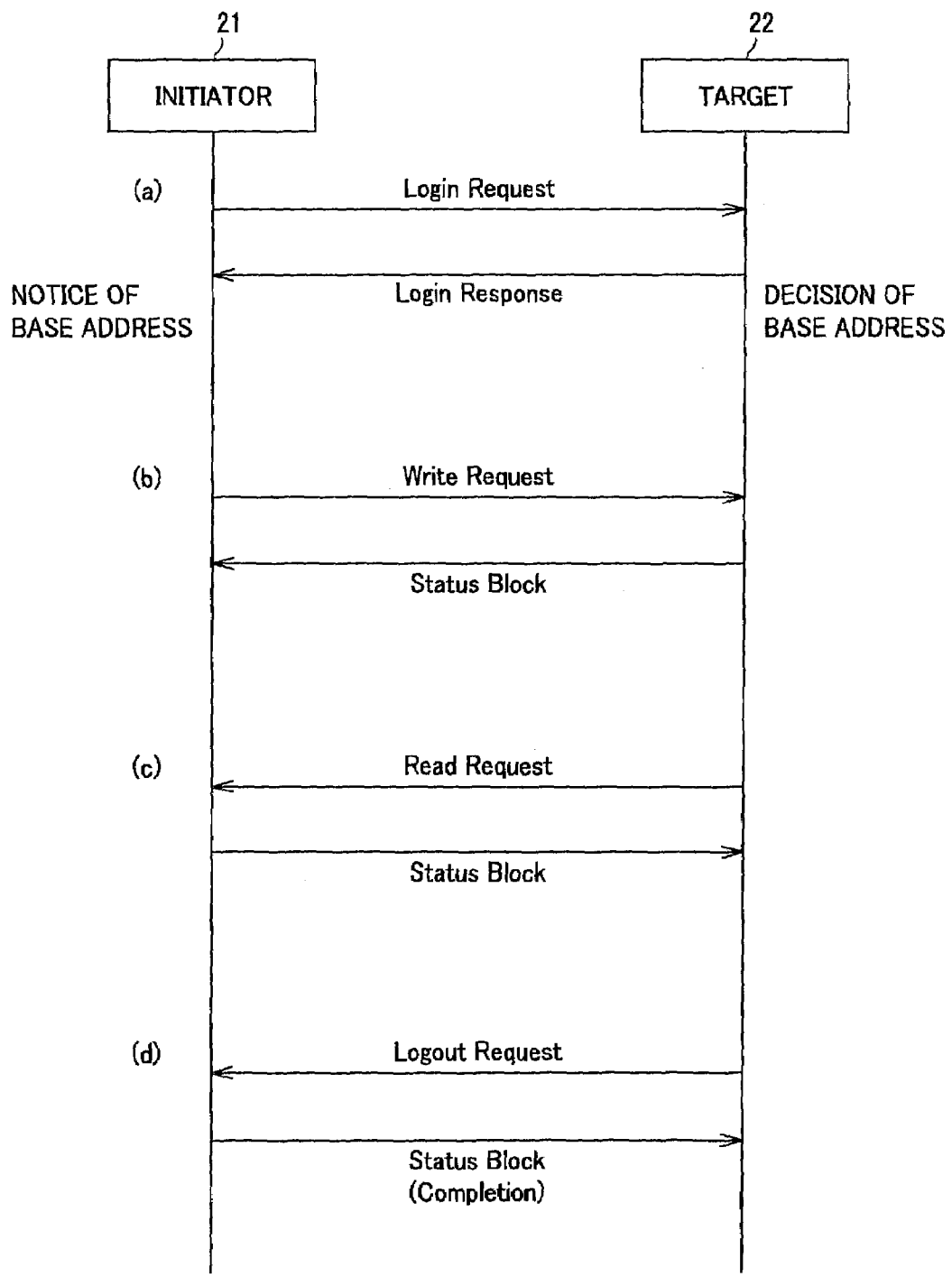
FIG. 13 illustrates the communication sequence between the initiator and the logical unit of the target.
Figure 14:
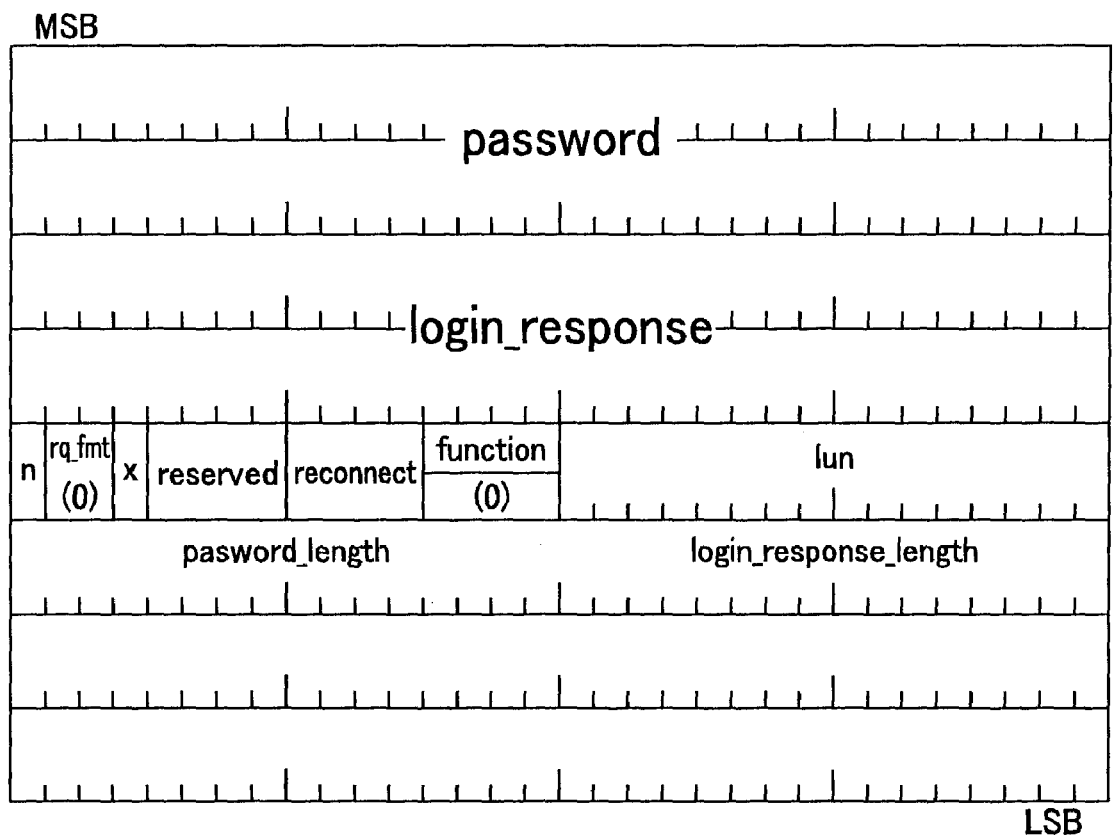
FIG. 14 shows the data structure of the login request block in the SBP2.
Figure 15:
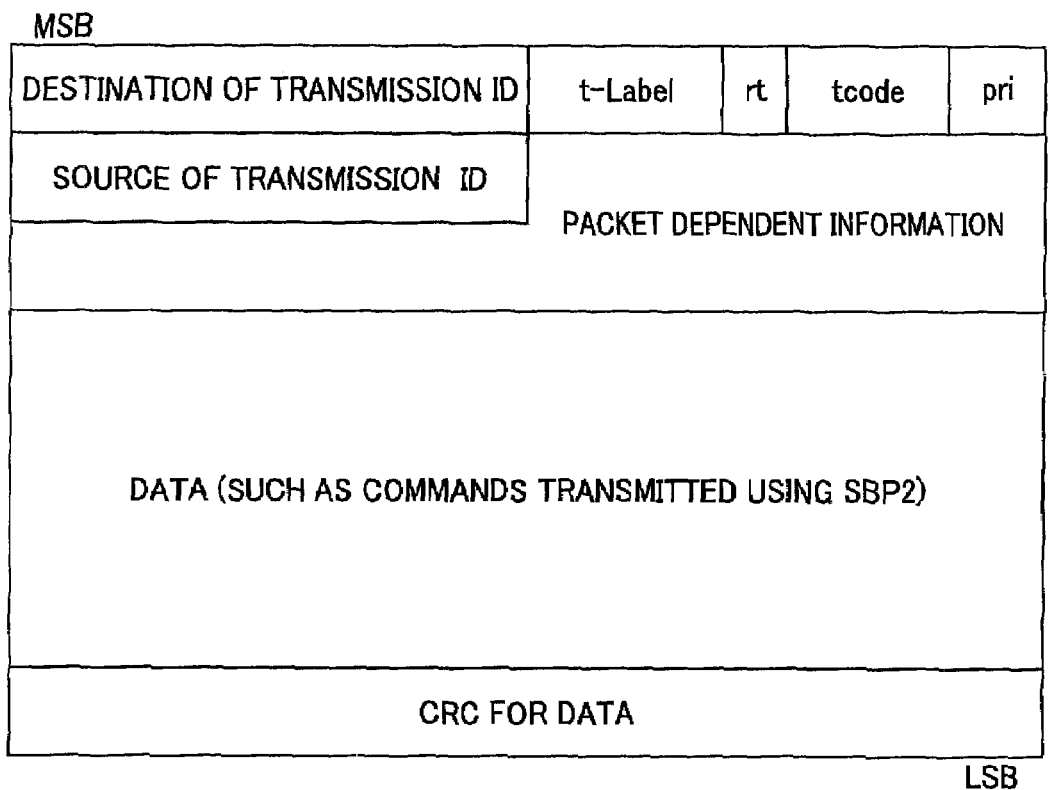
FIG. 15 shows the format of the communication packet in the IEEE1394 interface.
Figure 16:
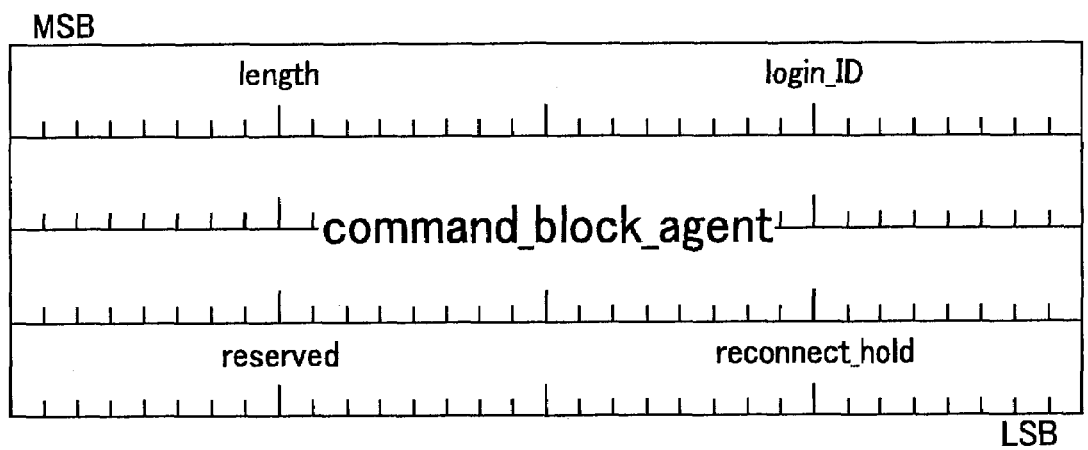
FIG. 16 depicts the data structure of a login response block.
Figure 17:
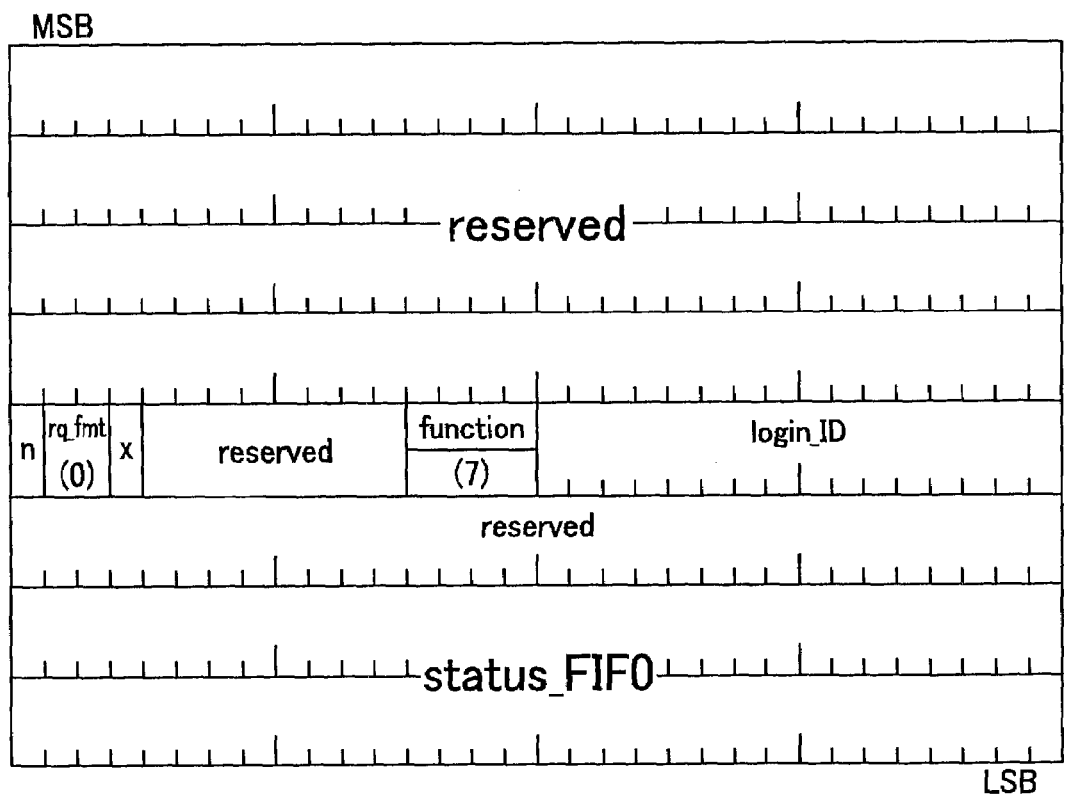
FIG. 17 depicts the data structure of a logout request block.
Figure 18:
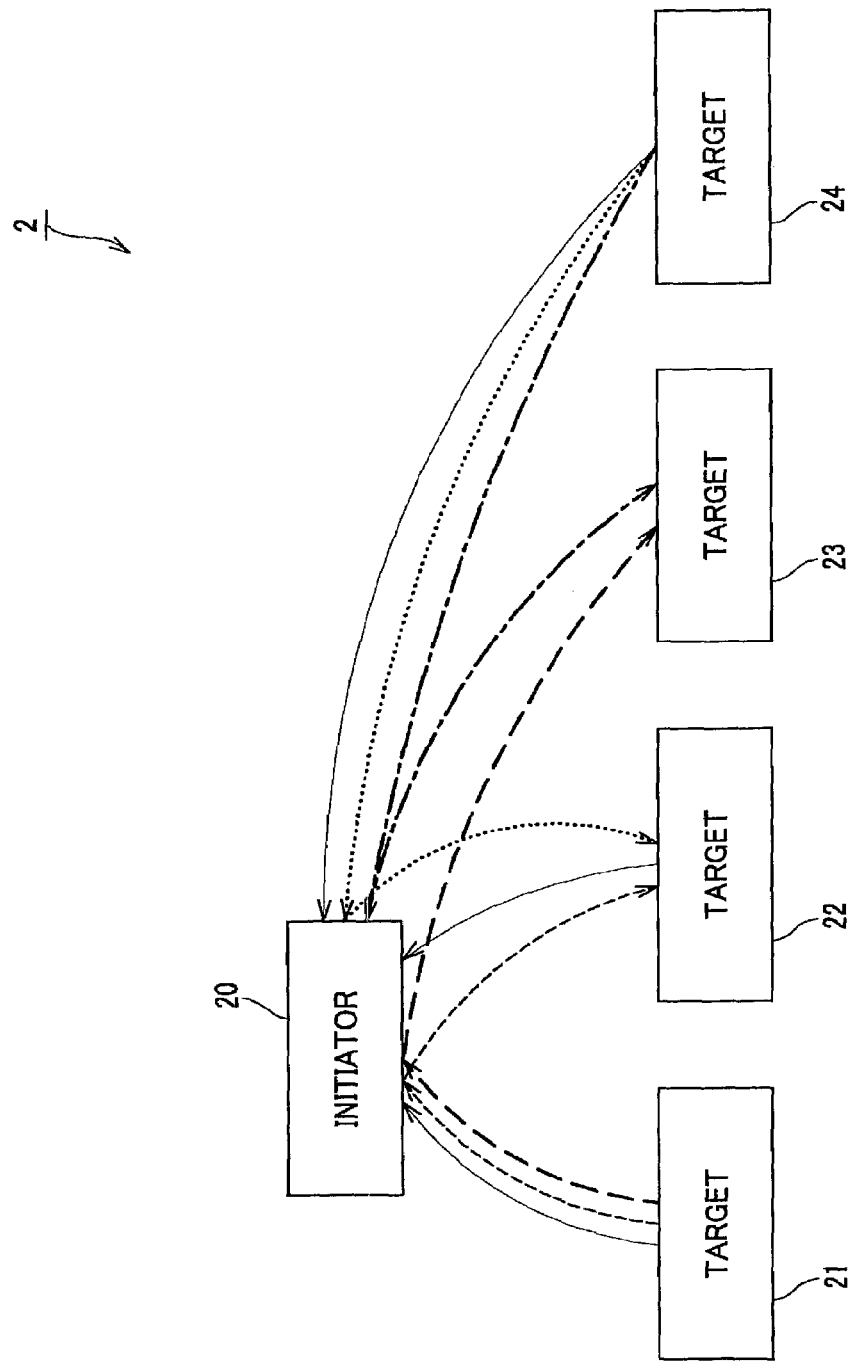
FIG. 18 is a block diagram showing the structure of a conventional data transfer system.

The method of transferring data from a data transmitting equipment to a data receiving equipment by the handshaking exploiting the supplementary information of the SBP2 by the data transfer system 1 is now explained by referring to the flowchart of FIGS. 9 and 10. In the following, the target 11 is the equipment for transmitting the data and the initiator 10 and the targets 12, 13 are the equipment receiving the data.

In a step ST1, the target 11 writes [1] in the supplementary information [data sending] of the SBP2 of the equipment transmitting the data. For example, by writing [1] in the supplementary information [data sending] of the SBP2 of the initiator 10, the effect that data is about to be sent is transmitted by the target 11 to the initiator 10 to reserve the initiator 10.

In a step ST2, the target 11 verifies whether or not [1] has been written in the supplementary information [data sending] of the SBP2 of the totality of the equipment performing the data transmission. The target 11 refers to for example the data transfer table to specify the equipment transmitting the data to confirm the supplementary information [data sending] of the SBP2 of the specified equipment. If [1] has not been written in the supplementary information [data sending] of the SBP2 of the totality of the equipment transmitting the data, the target 11 reverts to the step ST1. If the writing has been completed, the target 11 proceeds to a step ST3. The supplementary information [data sending] of the SBP2 being [0] means that reservation currently has not been made from other equipment.

In the step ST3, the target 11 verifies whether the supplementary information [data sending] of the ,SBP2 of the totality of the equipment performing the data transmission is [1] or [0]. Meanwhile, the supplementary information [data sending] of the SBP2 equal to [1] means that data transfer with other equipment is going on, while the supplementary information [data sending] of the SBP2 equal to [0] means that data transfer with other equipment with other equipment is not going on.

If the supplementary information [data sending] of the SBP2 is equal to [1], the target 11 proceeds to a step ST4 and, if the supplementary information [data sending] of the SBP2 is equal to [0], the target 11 proceeds to a step ST5.

In the step ST4, the target 11 changes the equipment transmitting the data to another equipment to then revert to the step ST3.

In the step ST5, the target 11 verifies whether or not the equipment transmitting the data is prohibited from performing the overwriting. If the overwriting is inhibited, the target 11 proceeds to a step ST6 and, if otherwise, the target 11 proceeds to a step ST7.

In the step ST6, the target 11 refers to the supplementary information [received count] of the SBP2 of the equipment transmitting the data to verify whether or not the value of the supplementary information [received count] of the SBP2 of the equipment transmitting the data is the same as the previous value. If the supplementary information [received count] of the SBP2 differs from the previous value, the target 11 proceeds to a step ST7. Meanwhile, if the supplementary information [received count] of the SBP2 is [0], the supplementary information [received count] of the SBP2 differs from the previous value, such that the target 11 proceeds to the step ST7.

In the step ST7, the target 11 transmits data. The equipment, to which data has been transmitted, performs preset error check, after receipt of the data, to verify whether or not an error has occurred. If the error has occurred the target 11 writes [1] in the supplementary information [transfer error] of the SBP2 to indicate that an error has occurred.

In a step ST8, the target 11 after completion of data transmission in the step ST7 writes [0] in the supplementary information [data sending] of the SBP2 of the equipment which has transmitted the data.

In a step ST9, the target 11 changes the supplementary information [received count] of the SBP2 of the equipment which has transmitted the data.

In a step ST10, the target 11 verifies whether or not the totality of the equipment transmitting the data has transmitted the data. If there is any equipment which has not completed the data transmission, the target 11 reverts to the step ST4 and, if data transmission has been completed to the totality of the equipment, the target proceeds to a step ST11. Meanwhile, in the target 11, the data volume transmitted each time is one packet (65535 bytes at the maximum).

In the step ST11, the target 11 checks supplementary information [transfer error] of the SBP2 of the totality of the equipment to which data has been transmitted to verify whether or not a transmission error has occurred. If the transmission error has occurred, the target 11 proceeds to a step ST12 and, if otherwise, the target 11 proceeds to a step ST15.

In the step ST12, the target 11 writes [1] in the supplementary information [data sending] of the SBP2 of the equipment to which data is to be re-transmitted. If the data re-transmission is to be made, the supplementary information [transfer error] of the SBP2 of the equipment, to which the data is to be re-transmitted, is set to [0].

In a step ST13, the target 11 re-transmits the data. After receiving the data, the equipment, to which the data has been retransmitted, performs preset error check to confirm whether or not the error has occurred. If an error has occurred, the target writes [1] in the supplementary information [transfer error] of the SBP2 to indicate that an error has occurred.

In a step ST14, the target 11 after end of re-transmission of the data in the step ST13 writes [0] in the supplementary information [data sending] of the SBP2 of the equipment to which the data has been transmitted. After awaiting the data taking by the equipment to which the data has been retransmitted, the target 11 reverts to the step ST11.

In the step ST15, the target 11 verifies whether or not the totality of data has been transmitted. If the totality of data has not been transmitted, the target 11 reverts to the step ST1. If the next data is transmitted to the respective equipment, the bank memories are changed over as described above.

If, in the data transfer system 1, employing the data transfer method according to the present invention, data transfer is to be made between the initiator and the plural targets, interconnected over the IEEE1394 interface, or between the targets, a table for data transfer is formulated in advance, data is transferred in accordance with the above table and the handshaking is performed in accordance with the information appended to the protocol for transfer of the IEEE1394 interface (SBP2). Thus, the load of handshaking by ORB during data transfer, so far necessary, can be relieved, thereby improving the data transfer rate. Moreover, data can be directly transferred from one target to the next, so that the transfer efficiency can be improved by a factor of two at the maximum as compared to the case of transferring the data from one target to the next with the use of the standard SBP2.

In the data transfer system 1 employing the data transfer system according to the present invention, in which plural bank memories are provided in the target, and data is transmitted from the bank memory to the respective equipment, in transferring the same data, so that, in transferring the same data to the plural equipment, only one data transfer from the device in the target to the bank memory suffices. Thus, even if the data transfer rate is low in the hardware within the target, the data transfer rate (the capability of the bus within the target multiplied by the number of the nodes in the counterpart party) can be raised on the IEEE1394 interface.

Moreover, in the data transfer system 1 employing the data transfer system according to the present invention, in which a data transfer table, including the information as to whether or not data overwrite is allowed, is formulated, data can be decimated only for a specified target, thereby relieving the load of for example data display in a CPU with limited processing capacity.

In addition, in the data transfer system 1, in which the information indicating the end of transfer of the information and data indicating the possible presence of data errors is appended to the transfer protocol of the IEEE1394 interface (SBP2), data transfer error processing may be performed directly after the data transfer, in the equipment to which data has been transmitted, and the results of the error processing can be written in the SBP2, thus allowing data retransmission as real-time data transfer characteristics are maintained. On the other hand, the data can be transmitted without dropout to the equipment of the destination of transmission.

What is claimed is:

1. A data transfer method for transferring data between an initiator and one target, and between a plurality of targets, wherein the plurality of targets includes adjacent and nonadjacent targets, the method comprising:
   directly interconnecting between the initiator and the target, and between the plurality of targets over an interface;
   acquiring buffer information for each of the plurality of targets at time of login by the initiator, wherein the buffer information comprises a quantity value of a number of buffer memories and addresses of the buffer memories, further wherein the number of buffer memories is acquired from a number of buffers display area appended to a trailing end of the buffer information, and the number of buffer memories is equal to a number of equipment with which data transfer is able to occur;
   formulating a data transfer table of a flow of data transfer at the initiator, wherein the data transfer table comprises node ID information for each of the plurality of targets;
   supplying the entire data transfer table, to each of the plurality of targets, allowing the data to be transferred from a first target to a second target without interposition of the initiator;
   performing handshaking, wherein the handshaking is based on predetermined information appended to a transfer protocol for the interface; and
   transferring data based on the data transfer table.

2. The data transfer method according to claim 1, wherein the interface is IEEE1394.

3. The data transfer method according to claim 1, wherein the data transfer table further comprises a first flag configured for determining whether the data is over-writable.

4. The data transfer method according to claim 1, wherein the transfer protocol comprises a second flag configured for determining whether transferring data is possible and indicating possible presence of data errors and an end of data transfer.

5. The data transfer method according to claim 1, wherein the transfer protocol is Serial Bus Protocol 2 (SBP2).

6. A data transfer method for transferring data between a plurality of targets, wherein the plurality of targets includes adjacent and nonadjacent targets, the method comprising:
   directly interconnecting between the plurality of targets over an interface;
   acquiring buffer information of each of the plurality of targets at a time of login by an initiator, wherein the buffer information comprises a Quantity value of a number of buffer memories and addresses of the buffer memories, further wherein the number of buffer memories is acquired from a number of buffers display area appended to a trailing end of the buffer information, and the number of buffer memories is equal to a number of equipment with which data transfer is able to occur;
   generating a data transfer table based on the buffer information from the plurality of targets at the initiator, wherein the data transfer table comprises node ID information for each of the plurality of the targets;
   supplying the entire data transfer table to each of the plurality of targets;
   performing handshaking, wherein the handshaking is based on predetermined information appended to a transfer protocol for the interface; and
   transferring data between the plurality of targets based on the data transfer table, without interposition of the initiator.

7. The data transfer method according to claim 6, wherein the interface is IEEE1394.

8. The data transfer method according to claim 6, wherein the data transfer table further comprises a first flag configured for determining the data is over-writable.

9. The data transfer method according to claim 6, wherein the transfer protocol comprises a second flag configured for determining transferring data is possible and indicating possible presence of data errors and an end of data transfer.

10. The data transfer method according to claim 6, wherein the transfer protocol is Serial Bus Protocol 2 (SBP2).

11. The data transfer method according to claim 6, wherein the data transfer table is supplied to respective targets allowing the data to be transferred from a first target to a second target without interposition of the initiator.

12. A data transfer method for transferring data between an initiator and a target, and in between a plurality of targets, wherein the plurality of targets includes adjacent and nonadjacent targets, the method comprising:

interconnecting between the initiator and the target, and between the plurality of targets over an interface, wherein the initiator is directly connected to the target and each of the plurality of targets;

acquiring buffer information for each of the plurality of targets at time of login by the initiator, wherein the buffer information comprises a quantity value of a number of buffer memories and addresses of the buffer memories, further wherein the number of buffer memories is acquired from a number of buffers display area appended to a trailing end of the buffer information, and the number of buffer memories is equal to a number of equipment with which data transfer is able to occur;

formulating a data transfer table of a flow of data transfer at the initiator, wherein the data transfer table comprises node ID information for each of the plurality of targets;

supplying the entire data transfer table, to each of the plurality of targets, allowing the data to be transferred from a first target to a second target without interposition of the initiator;

performing handshaking, wherein the handshaking is based on predetermined information appended to a transfer protocol for the interface; and transferring data based on the data transfer table.

* * * * *

UNITED STATES PATENT AND TRADEMARK OFFICE
CERTIFICATE OF CORRECTION

PATENT NO.       : 7,664,863 B2                                       Page 1 of 1
APPLICATION NO.  : 10/446552
DATED            : February 16, 2010
INVENTOR(S)      : Toshiaki Otake It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Seventh Day of December, 2010

David J. Kappos
*Director of the United States Patent and Trademark Office*